(12) United States Patent
Wengeler et al.

(10) Patent No.: US 11,377,574 B2
(45) Date of Patent: Jul. 5, 2022

(54) COMPOSITE MATERIALS

(71) Applicant: BASF SE, Ludwigshafen am Rhein (DE)

(72) Inventors: Lukas Wengeler, Ludwigshafen am Rhein (DE); Lena Arnold, Brasschaat (BE); Benjamin Schmidt-Hansberg, Ludwigshafen am Rhein (DE); Andreas Schroeder, Ludwigshafen am Rhein (DE); Ines Pietsch, Ludwigshafen am Rhein (DE); Nicholas R. Leclerc, Hillsborough, NJ (US)

(73) Assignee: BASF SE, Ludwigshafen am Rhein (DE)

( * ) Notice: Subject to any disclaimer, the term of this patent is extended or adjusted under 35 U.S.C. 154(b) by 327 days.

(21) Appl. No.: 16/326,728

(22) PCT Filed: Aug. 22, 2017

(86) PCT No.: PCT/EP2017/071096
§ 371 (c)(1),
(2) Date: Feb. 20, 2019

(87) PCT Pub. No.: WO2018/036997
PCT Pub. Date: Mar. 1, 2018

(65) Prior Publication Data
US 2019/0185705 A1   Jun. 20, 2019

Related U.S. Application Data

(60) Provisional application No. 62/378,376, filed on Aug. 23, 2016.

(51) Int. Cl.
| | |
|---|---|
| *C09D 179/02* | (2006.01) |
| *C09D 5/00* | (2006.01) |
| *F28F 13/18* | (2006.01) |
| *F28F 19/02* | (2006.01) |
| *C09D 7/63* | (2018.01) |
| *C08G 73/02* | (2006.01) |
| *C07F 1/08* | (2006.01) |
| *C07F 5/06* | (2006.01) |
| *C07F 7/00* | (2006.01) |
| *C07F 11/00* | (2006.01) |
| *C07F 15/02* | (2006.01) |

(52) U.S. Cl.
CPC ............ *C09D 179/02* (2013.01); *C09D 5/00* (2013.01); *C09D 5/002* (2013.01); *C09D 7/63* (2018.01); *F28F 13/18* (2013.01); *F28F 19/02* (2013.01); *C07F 1/08* (2013.01); *C07F 5/069* (2013.01); *C07F 7/003* (2013.01); *C07F 11/005* (2013.01); *C07F 15/025* (2013.01); *C08G 73/0206* (2013.01)

(58) Field of Classification Search
None
See application file for complete search history.

(56) References Cited

U.S. PATENT DOCUMENTS

| | | | |
|---|---|---|---|
| 3,844,737 A | 10/1974 | Macriss et al. | |
| 10,689,545 B2 | 6/2020 | Henninger et al. | |
| 2008/0281116 A1 | 11/2008 | Schubert et al. | |
| 2009/0169857 A1 | 7/2009 | Fischer et al. | |
| 2010/0132547 A1* | 6/2010 | Masel | B01J 20/3265 95/90 |
| 2011/0011805 A1* | 1/2011 | Schubert | B01J 20/226 210/689 |
| 2011/0269984 A1* | 11/2011 | Chen | C07F 3/003 556/49 |
| 2015/0136316 A1* | 5/2015 | Chen | B01J 20/165 156/272.2 |
| 2016/0064773 A1* | 3/2016 | Choi | H01M 10/052 429/303 |
| 2016/0084541 A1 | 3/2016 | Aguado et al. | |
| 2017/0275076 A1 | 9/2017 | Edgington et al. | |
| 2017/0336030 A1 | 11/2017 | Weickert et al. | |
| 2018/0009997 A1 | 1/2018 | Bhagwagar et al. | |
| 2018/0328601 A1 | 11/2018 | Weickert et al. | |
| 2018/0333696 A1 | 11/2018 | Burckhart et al. | |
| 2018/0345245 A1 | 12/2018 | Maurer et al. | |
| 2019/0001279 A1 | 1/2019 | Scherzer et al. | |
| 2019/0185705 A1 | 6/2019 | Wengeler et al. | |

FOREIGN PATENT DOCUMENTS

| | | |
|---|---|---|
| CN | 101330979 A | 12/2008 |
| CN | 103249738 A | 8/2013 |
| CN | 103894074 A | 7/2014 |

(Continued)

OTHER PUBLICATIONS

Machine Translation of CN 103894074 A (Year: 2014).*
CN Office Action dated Sep. 30, 2020 for CN Application No. 201780051652 (15 pages of English Translation and 14 pages of Original document).
International Preliminary Report on Patentability received for PCT Patent Application No. PCT/EP2017/071096, dated Mar. 7, 2019, 8 pages.
International Search Report for PCT/EP2017/071096 dated Nov. 16, 2017.
Lin, Y., et al., "Polyethyleneimine Incorporated Metal-Organic Frameworks Adsorbent for Highly Selective $CO_2$ Capture", Scientific Reports 3, Article No. 1859, (2013), pp. 1-7.

(Continued)

*Primary Examiner* — Lan Vinh
*Assistant Examiner* — Bradford M Gates
(74) *Attorney, Agent, or Firm* — Faegre Drinker Biddle & Reath LLP

(57) ABSTRACT

Disclosed herein are composite materials and methods for forming the same. In one embodiment, a composite material comprises a primer layer comprising a polyalkylenimine, and an active layer comprising a binder and a metal organic framework (MOF), wherein the MOF comprises a bidentate organic compound coordinated to a metal ion, and wherein the active layer forms a coating on the primer layer.

20 Claims, No Drawings

(56) References Cited

FOREIGN PATENT DOCUMENTS

| | | |
|---|---|---|
| CN | 103958027 A | 7/2014 |
| CN | 104853915 A | 8/2015 |
| DE | 102005035762 A1 | 2/2007 |
| EP | 2998378 A1 | 3/2016 |
| KR | 10-1004304 B1 | 12/2010 |
| KR | 10-2015-0036105 A | 4/2015 |
| WO | WO-2012077030 A1 | 6/2012 |
| WO | 2016/037043 A1 | 3/2016 |
| WO | WO-2016075100 | 5/2016 |
| WO | WO-2016075129 A1 | 5/2016 |
| WO | WO-2016116406 A1 | 7/2016 |
| WO | 2016/126362 A1 | 8/2016 |
| WO | WO-2016180807 A1 | 11/2016 |
| WO | WO-2016180809 | 11/2016 |

OTHER PUBLICATIONS

Wickenheisser, M., et al., "Hierarchical MOF-xerogel monolith composites from embedding MIL-100(Fe,Cr) and MIL101-(Cr) in resorcinol-formaldehyde xerogels for water adsorption applications", Microporous and Mesoporous Materials 215, (2015), pp. 143-153.

Written Opinion of the International Searching Authority for PCT/EP2017/071096 dated Nov. 16, 2017.

Zhu, H., et al., "Alginate Hydrogel: A Shapeable and Versatile Platform for in Situ Preparation of Metal-Oragnic Framework-Polymer Composites", ACS Applied Materials & Interfaces 2016, vol. 8, No. 27, pp. 17395-17401.

JP Office Action dated Sep. 7, 2021 for JP Application No. 2019-511365, 6 pages (3 pages of English Translation and 3 pages of Original document).

\* cited by examiner

COMPOSITE MATERIALS

CROSS-REFERENCE TO RELATED APPLICATIONS

This application is a national stage application (under 35 U.S.C. § 371) of PCT/EP2017/071096, filed Aug. 22, 2017, which claims benefit of U.S. Application No. 62/378,376, filed Aug. 23, 2016, both of which are incorporated herein by reference in their entirety.

FIELD

Composite materials, articles coated with the composite materials and methods of making and using the composite materials. According to various example aspects, the composite materials include a primer layer and an active layer formed of a binder and a metal organic framework. The active layer can form a coating on the primer layer.

BACKGROUND

Metal Organic Frameworks ("MOFs") are a class of porous, crystalline, three-dimensional networked materials formed by assembling metal ions or clusters with organic linkers. Selection of the metal and linker has a significant impact on the structure and properties of the MOFs. MOFs have a definite pore size, shape and functionality and are suitable for many applications. MOF materials are desired in many applications, for example, on plastic surfaces for climate control or controlled release in packaging, heat exchanger plates with polymeric anti-corrosion base coating, and on metal surfaces in aluminum plate heat exchangers in heat pumps and building air-conditioning. MOF materials can enhance the performance of heat transfer devices and components such as chillers, heat pumps, heating, ventilating and air conditioning (HVAC) systems, radiators and refrigerators. Indeed, MOF materials have a variety of uses including, for example, gas adsorption, storage, material separations, catalysis, sensors, drug delivery and chemical reaction of substances. Additionally, MOFs can be used as supports for catalysts or as catalyst materials.

To improve the properties of MOFs, various combinations of metal ions and at least bidentate organic compounds have been examined. MOFs in which the metal ion is a main group element of the Periodic Table have also been examined, such as porous aluminum terephthalate MOFs.

At present, MOF coatings are typically produced at very low deposition rates (direct growth methods), or by using inorganic and/or polymeric binders in organic solvents or water-solvent mixtures. Besides higher process costs, solvent-based MOF coatings have a reduced sorption capacity of about 20-30%. On the other hand, MOF coatings containing water-based binders have insufficient adhesion for heat transfer applications involving heat cycles in a humid environment.

There is therefore a continuing need for MOF materials, particularly for heat transfer applications, which have superior properties compared to MOF materials known in the prior art. Such MOF materials should have good adhesion to substrates, good durability (e.g., 90° peel test >5 N/m), little or no reduction in sorption capacity and low process costs (e.g., fast deposition rates in green solvents, processability, etc.) and wetting behavior of the coating substrate. It is therefore an object of the present disclosure to provide composite materials comprising MOFs that have one or more of the properties identified above.

BRIEF SUMMARY

The following presents a simplified summary of various aspects of the present disclosure in order to provide a basic understanding of such aspects. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In one aspect of the present disclosure, a composite material comprises a primer layer comprising a polyalkylenimine, and an active layer comprising a binder and a metal organic framework (MOF). In certain embodiments, the MOF comprises an at least bidentate organic compound coordinated to a metal ion. In certain embodiments, the active layer forms a coating on the primer layer.

In certain embodiments, the composite material comprises branched polyalkylenimine, straight polyalkylenimine or a combination thereof. In certain embodiments, the composite material comprises a branched polyalkylenimine. In certain embodiments, the polyalkylenimine has a charge density of about 1 to about 35 meq/g. In certain embodiments, the alkylene moiety comprises ethylenimine, 1,2-propylenimine, 1-2-butylenimine, 2,3-butylenimine or a combination thereof. In certain embodiments, the molecular weight of the polyalkylenimine is from about 20,000 Daltons to about 3,000,000 Daltons. In certain embodiments, the molecular weight of the polyalkylenimine is from about 500,000 Daltons to about 1,000,000 Daltons. In certain embodiments, the polyalkylenimine is polyethylenimine. In certain embodiments, the polyalkylenimine is a branched polyethylenimine.

In certain embodiments, the primer layer further comprises a binder component. In certain embodiments, the binder component comprises at least one of polyacrylamide, polyacrylate, polytetrafluoroethylene and polyvinylidene fluoride. In certain embodiments, the binder component is water-based. In certain embodiments, the binder component is solvent-based.

In certain embodiments, the primer layer has a thickness of about 10 µm or less. In certain embodiments, the primer layer has a thickness of about 0.05 µm to about 5 µm. In certain embodiments, the active layer has a thickness of about 50 µm to about 500 µm. In certain embodiments, the active layer has a thickness of about 100 µm to about 250 µm.

In certain embodiments, the metal ion comprises a metal selected from a group consisting of aluminum (Al), iron (Fe), copper (Cu), zirconium (Zr), titanium (Ti) and chromium (Cr).

In certain embodiments, the at least bidentate organic compound is derived from a compound selected from a group consisting of fumaric acid, terephthalic acid, isophthalic acid, trimesate, aminoterephthalic acid and biphenyldicarboxylic acid.

In certain embodiments, the MOF comprises a material selected from a group consisting of aluminum fumarate, aluminum isophthalate, zirconium terephthalate, zirconium aminoterephthalate, zirconium biphenyldicarboxylate, copper trimesate, titanium terephthalate, iron trimesate, aluminum trimesate and chromium terephthalate.

In certain embodiments, the metal ion is an aluminum (Al) ion and the at least bidentate organic compound is derived from fumaric acid, terephthalic acid or isophthalic acid.

In certain embodiments, the metal ion is an iron (Fe) ion and the at least bidentate organic compound is derived from 1,3,5-benzenetricarboxylic acid.

In certain embodiments, the active layer comprises about 5 wt % to about 25 wt % of the binder, preferably 2 to 20 wt %, more preferably 5 to 20 wt %, even more preferably 5 to 15 wt % of the binder. In certain embodiments, the active layer comprises about 2 wt % to about 25 wt % of the binder, preferably 5 to 25 wt %, more preferably 5 to 20 wt %, even more preferably 7.5 to 20 wt % of the binder. In certain embodiments, the MOF is in powder form and dispersed within the binder.

In certain embodiments, the material has a water adsorption capacity of about 0.3 g/g to about 0.8 g/g. In certain embodiments, the material has a bulk density of about 0.2 g/cm$^3$ to about 2 g/cm$^3$ and a Brunauer-Emmett-Teller (BET) surface area of at least 200 m$^2$/g. In certain embodiments, the material has a BET surface area of at least 500 m$^2$/g. In certain embodiments, the material has a BET surface area of about 200 m$^2$/g to about 3,000 m$^2$/g. In certain embodiments, the active layer has an adhesion to the primer layer of about 7.5 N/m or more.

In certain embodiments, the active layer maintains adhesion to the primer layer upon repeated exposure to a temperature of about 20° C. to about 150° C. at a relative humidity of about 5% rH to about 100% rH. In certain embodiments, the repeated exposure comprises about 10 cycles to about 1,000,000 cycles in a heat transfer device. In certain embodiments, the repeated exposure comprises about 500 cycles to about 1,000,000 cycles in a heat transfer device. In certain embodiments, the heat transfer device is selected from a group consisting of a chiller, a heat pump, a heating, ventilating and air conditioning (HVAC) system, a radiator and a refrigerator.

In another aspect of the present disclosure, an article comprises: a substrate; a primer layer comprising a polyalkylenimine; and an active layer comprising a binder and a metal organic framework (MOF). In certain embodiments, the MOF comprises an at least bidentate organic compound coordinated to a metal ion. In certain embodiments, the primer layer forms a coating on the substrate and the active layer forms a coating on the primer layer.

In certain embodiments, the substrate comprises a material selected from a group consisting of a metal, a polymer, a woven fabric, a non-woven fabric and a fiber composite material. In certain embodiments, the substrate is a rigid three-dimensional object, a flexible foil or a fabric.

In certain embodiments, the substrate is a heat transfer element. In certain embodiments, the substrate is a chiller component, a heat pump component, a heating, ventilating and air conditioning (HVAC) component, a packaging component, an odor removal component, a radiator component, a fin of a heat transfer device, or a refrigerator component. In certain embodiments, the active layer and the primer layer together form a composite material, and the composite material has an adhesion to the substrate of about 7.5 N/m or more, as measured by a 90° peel test measured at 50 mm/min. In certain embodiments, the active layer and the primer layer together form a composite material, and the composite material maintains adhesion to the substrate of about 5 N/m or more as measured by a 90° peel test measured at 50 mm/min, after immersion of the article in boiling water for about 3 min.

In another aspect of the present disclosure, a method of forming a composite material comprises: forming a primer layer comprising a polyalkylenimine; and coating the primer layer with an active layer comprising a binder and a metal organic framework (MOF). In certain embodiments, the MOF comprises an at least bidentate organic compound coordinated to a metal ion.

In certain embodiments, coating the primer layer comprises dip coating, spray coating, electrostatic spray coating, knife coating, curtain coating or slot-die coating the active layer onto the primer layer. In certain embodiments, coating the primer layer comprises a single-step process or a multi-step process.

In certain embodiments, the density of the MOF in the active layer is about 0.2 g/cm$^3$ to about 1 g/cm$^3$. In certain embodiments, about 1% to about 100% of the primer layer is coated with the active layer.

In certain embodiments, coating the primer layer with the active layer comprises providing a slurry of the binder and the MOF and applying the slurry to the primer layer. In certain embodiments, the slurry has a solids content of about 35 wt % or less, preferably 25 wt % or less.

In certain embodiments, the slurry has a solids content of about 5 wt % to about 25 wt %. In certain embodiments, the slurry further comprises water and about 5 wt % or less of volatile organic compounds, surfactants, or a combination thereof. In certain embodiments, the slurry further comprises water and about 0.1 wt % or less of volatile organic compounds, surfactants, or a combination thereof.

In certain embodiments, the slurry has a viscosity of about 1 cP to about 30,000 cP. In certain embodiments, the slurry is at a temperature of about 10° C. to about 60° C. In certain embodiments, the slurry is at a pressure of about 80 kPa to about 120 kPa. In certain embodiments, the slurry has a shear rate of about 1/s to about 10,000/s.

In certain embodiments, the method further comprises contact drying the active layer with forced convection for rigid heat exchangers or with an impinging jet dryer for roll to roll coatings at a temperature of about 60° C. to about 120° C., a pressure of about ambient to about vacuum and a humidity of about 5% rH to about 40% rH.

In another aspect of the present disclosure, a method for forming a metal organic framework (MOF) composite material on a substrate comprises: coating the substrate with a primer layer comprising polyalkylenimine; and coating the primer layer with an active layer comprising a binder and a metal organic framework (MOF). In certain embodiments, the MOF comprises a at least bidentate organic compound coordinated to a metal ion.

In certain embodiments, coating the substrate comprises dip coating, spray coating, roll coating, knife coating, curtain coating or slot die coating the primer layer onto the substrate. In certain embodiments, coating the primer layer comprises knife coating the active layer onto the primer layer. In certain embodiments, coating the primer layer comprises a single-step process or a multi-step process.

In certain embodiments, the substrate is a rigid three-dimensional object, a flexible foil or a flexible fabric. In certain embodiments, coating the substrate and coating the primer layer with the active layer comprises a continuous roll-to-roll process for a flexible substrate or a discontinuous coating process for a rigid substrate.

In another aspect of the present disclosure, a method of using a composite material for adsorbing fluid comprises: providing a heat transfer device comprising a composite material on a heat transfer component thereof, the composite material comprising: a primer layer comprising a polyalkylenimine; and an active layer comprising a binder and a metal organic framework (MOF). In certain embodiments, the MOF comprises an at least bidentate organic compound coordinated to a metal ion. In certain embodiments, the active layer forms a coating on the primer layer. In certain embodiments, the method further comprises operating the heat transfer device to adsorb or desorb a working fluid onto or from the composite material.

In certain embodiments, operating the heat transfer device comprises exposing the heat transfer component to heating and cooling at temperatures of about 20° C. to about 140° C. for about 1,000 cycles or more. In certain embodiments the operating the heat transfer device comprises exposing the heat transfer component to air having a moisture concentration of about 1 $g/m^3$ to about 30 $g/m^3$. In certain embodiments, operating the heat transfer device comprises exposing the heat transfer component to an aqueous fluid for about 1,000 cycles or more.

In another aspect of the present disclosure, a method of using a composite material to adsorb moisture comprises: providing a device comprising a composite material, the composite material comprising: a primer layer comprising a polyalkylenimine; and an active layer comprising a binder and a metal organic framework (MOF). In certain embodiments, the MOF comprises an at least bidentate organic compound coordinated to a metal ion. In certain embodiments, the active layer forms a coating on the primer layer. In certain embodiments, the method further comprises adsorbing moisture from an environment onto composite material.

In certain embodiments, the device is a packaging container. In certain embodiments, the packaging container comprises at least one material selected from a group consisting of a polymer, a metal foil, paper, cardboard, a woven fabric, a non-woven fabric a molded plastic or metal and a cast plastic. In certain embodiments, the packaging container comprises at least one of polypropylene, polypropylene fibers, polyethylene, polystyrene, polyethylene terephthalate, polyethylene terephthalate fibers, polyester, flash-spun high-density polyethylene, molded fiber, aluminum, nylon polyamide, pressed paperboard and biodegradable versions thereof. In certain embodiments, the packaging container is a shipping container.

In certain embodiments, the composite material is dispersed within the device. In certain embodiments, the composite material is comprised in a sachet within the device. In certain embodiments, the sachet is perforated. In certain embodiments, the composite material is coated on a surface of the device. In certain embodiments, the composite material is integrally formed or extruded with at least one surface of the device. In certain embodiments, the composite material comprises a multi-layered film.

In certain embodiments, the primer layer has a thickness of about 0.05 μm to about 15 μm.

In certain embodiments, the primer layer has a thickness of about 0.05 μm to about 5 μm. In certain embodiments, the active layer has a thickness of about 50 μm to about 500 μm.

DETAILED DESCRIPTION

Metal-organic framework (MOF) materials can enhance the performance of certain heat transfer devices and components. Such devices and components can include, but are not limited to, chillers, heat pumps, heating, ventilating and air conditioning (HVAC) systems, radiators and refrigerators.

According to various example aspects of the disclosure, the MOF materials can be composite materials and can be any structure made from at least two distinct materials, one of which includes a MOF. The structure can be, for example, a particle, pellet, film, layer, gel (including hydrogels and aerogels), cross-linked (including chemically or physically cross-linked) material, or any suitable combination thereof. The structure can have a suitable morphology, including, but not limited to, a homogeneous mixture, a lamellar structure, a core-shell structure, a graduated material structure, spherical or non-spherical particles embedded within a matrix, fibers or rods embedded within a matrix, woven or non-woven fiber fabric, and an interpenetrating network.

According to various example aspects of the disclosure, MOF materials can be formed of a composite material having a primer layer and an active layer, where the active layer includes a binder and a metal organic framework. The primer layer can include any suitable material such as a polyalkylenimine. The polyalkylenimine can be branched, straight or a combination thereof, for example, the primer layer can include a branched polyalkylenimine. The polyalkylenimine can have a charge density of about 1 to about 35 meq/g and the molecular weight of the polyalkylenimine can be from about 20,000 Daltons to about 3,000,000 Daltons or from about 500,000 Daltons to about 1,000,000 Daltons.

According to certain example aspects, the alkylene moiety of the polyalkylenimine can be ethylenimine, 1,2-propylenimine, 1-2-butylenimine, 2,3-butylenimine or a combination thereof.

For example, the polyalkylenimine can be a polyethylenimine, such as, a branched polyethylenimine. In certain aspects, the branched polyethylenimine can be highly branched. It should be noted that polyethylenimine is water-soluble and thus, would not be expected to promote good adhesion under the high humidity and temperature conditions present in heat exchange devices such as heat exchangers and heat pumps with water absorbing desiccants.

The primer layer (with or without the binder) is preferably as thin as possible. For example, the primer layer can have a thickness of about 10 μm or less. In certain aspects, the primer layer can have a thickness of about 0.05 μm to about 5 μm.

The active layer can form a coating on the primer layer. The active layer can include a MOF comprising an at least bidentate organic compound coordinated to a metal ion. The at least bidentate organic compound can include one or more carboxylic acids having, for example, two or more atoms independently selected from oxygen, sulfur and nitrogen through which the at least bidentate organic compound can coordinate to the metal. These atoms can be a part of the backbone of the at least bidentate organic compound or can be a part of functional groups.

The at least bidentate organic compound can include functional groups through which the abovementioned coordinate bonds can be formed. Such functional groups include, but not limited to one or more of —OH, —SH, —NH$_2$, —NH(—R—H), —N(R—H)$_2$, —CH$_2$OH, —CH$_2$SH, —CH$_2$NH$_2$, —CH$_2$NH(—R—H), —CH$_2$N(—R—H)$_2$, —CO$_2$H, COSH, —CS$_2$H, —NO$_2$, —B(OH)$_2$, —SO$_3$H, —Si(OH)$_3$, —Ge(OH)$_3$, —Sn(OH)$_3$, —Si(SH)$_4$, —Ge(SH)$_4$, —Sn(SH)$_3$, —PO$_3$H$_2$, —AsO$_3$H, —AsO$_4$H, —P(SH)$_3$, —As(SH)$_3$, —CH(RSH)$_2$, —C(RSH)$_3$, —CH(RNH$_2$)$_2$, —C(RNH$_2$)$_3$, —CH(ROH)$_2$, —C(ROH)$_3$, —CH(RCN)$_2$, or —C(RCN)$_3$, where R may be, for example, an alkylene group having 1, 2, 3, 4 or 5 carbon atoms, for example a methylene, ethylene, n-propylene, isopropylene, n-butylene, isobutylene, tert-butylene or n-pentylene group, or an aryl group having 1 or 2 aromatic rings, for example 2 $C_6$ rings, which may, if appropriate, be fused and may, independently of one another, be substituted by, in each case, at least one substituent and/or may, independently of one another, include, in each case, at least one heteroatom, for example N, O and/or S. In addition, in certain aspects, the at least bidentate organic compound can have two or more carboxy groups as functional groups.

The functional groups can, in principle, be bound to any suitable organic compound as long as the organic compound including these functional groups is capable of forming the coordinate bond and producing the framework. The at least bidentate organic compound which includes the functional groups can be derived from a saturated or unsaturated aliphatic compound or an aromatic compound or both an aliphatic and aromatic compound.

The aliphatic compound or the aliphatic part of the both aliphatic and aromatic compound can be linear, branched and/or cyclic, and/or can have multiple rings per compound. The aliphatic compound or the aliphatic part of the both aliphatic and aromatic compound can include from 1 to 18, 1 to 14, 1 to 13, 1 to 12, 1 to 11, or 1 to 10 carbon atoms, for example 1, 2, 3, 4, 5, 6, 7, 8, 9 or 10 carbon atoms (e.g., methane, adamantane, acetylene, ethylene or butadiene).

In certain aspects, the at least bidentate organic compound can be derived from a dicarboxylic acid, tricarboxylic acid, a tetracarboxylic acid or a sulfur analog thereof. Sulfur analogs include the functional groups —C(=O)SH and its tautomer and C(=S)SH, which can be used in place of one or more of the carboxylic acid groups.

The term "derived" can mean that the at least bidentate organic compound is present in partially deprotonated or completely deprotonated form in the MOF and can comprise further substituents such as —OH, —NH$_2$, —OCH$_3$, —CH$_3$, —NH(CH$_3$), —N(CH$_3$)$_2$, —CN and halides. In certain aspects, the at least bidentate organic compound can be an aliphatic or aromatic acyclic or cyclic hydrocarbon having 1 to 18 carbon atoms and, in addition, can have at least two carboxy groups as functional groups.

The at least bidentate organic compound can be derived from one or more dicarboxylic acid including, but not limited to, oxalic acid, succinic acid, tartaric acid, 1,4-butanedicarboxylic acid, 1,4-butenedicarboxylic acid, 4-oxopyran-2,6-dicarboxylic acid, 1,6-hexanedicarboxylic acid, decanedicarboxylic acid, 1,8-heptadecanedicarboxylic acid, 1,9-heptadecanedicarboxylic acid, heptadecanedicarboxylic acid, acetylenedicarboxylic acid, 1,2-benzenedicarboxylic acid, 1,3-benzenedicarboxylic acid, 2,3-pyridinedicarboxylic acid, pyridine-2,3-dicarboxylic acid, 1,3-butadiene-1,4-dicarboxylic acid, 1,4-benzene-dicarboxylic acid, p-benzenedicarboxylic acid, imidazole-2,4-dicarboxyolic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 4,4'-diamino-phenylmethane-3,3'-dicarboxylic acid, quinoline-3,4-dicarboxylic acid, 7-chloro-4-hydroxyquinoline-2,8-dicarboxylic acid, diimidedicarboxylic acid, pyridine-2,6-dicarboxylic acid, 2-methylimidazole-4,5-dicarboxylic acid, thiophene-3,4-dicarboxylic acid, 2-isopropylimidazole-4,5-dicarboxylic acid, tetrahydropyran-4,4-dicarboxylic acid, perylene-3,9-dicarboxylic acid, perylenedicarboxylic acid, Pluriol E 200-dicarboxylic acid, 3,6-dioxaoctanedicarboxylic acid, 3,5-cyclohexadiene-1,2-dicarboxylic acid, octadicarboxylic acid, pentane-3,3-dicarboxylic acid, 4,4'-diamino-1,1'-biphenyl-3,3'-dicarboxylic acid, 4,4'-diaminobiphenyl-3,3'-dicarboxylic acid, benzidine-3,3'-dicarboxylic acid, 1,4-bis(phenylamino)benzene-2,5-dicarboxylic acid, 1,1'-binaphthyldicarboxylic acid, 7-chloro-8-methylquinoline-2,3-dicarboxylic acid, 1-anilinoanthraquinone-2,4'-dicarboxylic acid, polytetrahydrofuran-250-dicarboxylic acid, 1,4-bis(carboxymethyl)piperazine-2,3-dicarboxylic acid, 7-chloroquinoline-3,8-dicarboxylic acid, 1-(4-carboxy)phenyl-3-(4-chloro)phenylpyrazoline-4,5-dicarboxylic acid, 1,4,5,6,7,7-hexachloro-5-norbornene-2,3-dicarboxylic acid, phenylindanedicarboxylic acid, 1,3-dibenzyl-2-oxoimidazolidine-4,5-dicarboxylic acid, 1,4-cyclohexanedicarboxylic acid, naphthalene-1,8-dicarboxylic acid, 2-benzoyl-benzene-1,3-dicarboxylic acid, 1,3-dibenzyl-2-oxoimidazolidine-4,5-cis-dicarboxylic acid, 2,2'-biquinoline-4,4'-dicarboxylic acid, pyridine-3,4-dicarboxylic acid, 3,6,9-trioxaundecanedicarboxylic acid, hydroxybenzophenonedicarboxylic acid, Pluriol E 300-dicarboxylic acid, Pluriol E 400-dicarboxylic acid, Pluriol E 600-dicarboxylic acid, pyrazole-3,4-dicarboxylic acid, 2,3-pyrazinedicarboxylic acid, 5,6-dimethyl-2,3-pyrazinedicarboxylic acid, (bis(4-aminophenyl)ether)diimide-dicarboxylic acid, 4,4'-diaminodiphenylmethanediimidedicarboxylic acid, (bis(4-amino-phenyl)sulfone)diimidedicarboxylic acid, 1,4-naphthalenedicarboxylic acid, 2,6-naphthalenedicarboxylic acid, 1,3-adamantanedicarboxylic acid, 1,8-naphthalene-dicarboxylic acid, 2,3-naphthalenedicarboxylic acid, 8-methoxy-2,3-naphthalene-dicarboxylic acid, 8-nitro-2,3-naphthalenecarboxylic acid, 8-sulfo-2,3-naphthalene-dicarboxylic acid, anthracene-2,3-dicarboxylic acid, 2',3'-diphenyl-p-terphenyl-4,4''-dicarboxylic acid, (diphenyl ether)-4,4'-dicarboxylic acid, imidazole-4,5-dicarboxylic acid, 4(1H)-oxothiochromene-2,8-dicarboxylic acid, 5-tert-butyl-1,3-benzenedicarboxylic acid, 7,8-quinolinedicarboxylic acid, 4,5-imidazoledicarboxylic acid, 4-cyclohexene-1,2-dicarboxylic acid, hexatriacontanedicarboxylic acid, tetradecanedicarboxylic acid, 1,7-heptadicarboxylic acid, 5-hydroxy-1,3-benzenedicarboxylic acid, 2,5-dihydroxy-1,4-dicarboxylic acid, pyrazine-2,3-dicarboxylic acid, furan-2,5-dicarboxylic acid, 1-nonene-6,9-dicarboxylic acid, eicosenedicarboxylic acid, 4,4'-dihydroxydiphenylmethane-3,3'-dicarboxylic acid, 1-amino-4-methyl-9,10-dioxo-9,10-dihydroanthracene-2,3-dicarboxylic acid, 2,5-pyridinedicarboxylic acid, cyclohexene-2,3-dicarboxylic acid, 2,9-dichlorofluorubin-4,11-dicarboxylic acid, 7-chloro-3-methylquinoline-6,8-dicarboxylic acid, 2,4-dichlorobenzophenone-2',5'-dicarboxylic acid, 1,3-benzenedicarboxylic acid, 2,6-pyridinedicarboxylic acid, 1-methylpyrrole-3,4-dicarboxylic acid, 1-benzyl-1H-pyrrole-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid, 1,14-tetradecanedicarboxylic acid, 5,6-dehydronorbornane-2,3-dicarboxylic acid, 5-ethyl-2,3-pyridinedicarboxylic acid and camphordicarboxylic acid.

The at least bidentate organic compound can be alternatively or additionally derived from one or more tricarboxylic acid including, but not limited to, 2-hydroxy-1,2,3-propanetricarboxylic acid, 7-chloro-2,3,8-quinolinetricarboxylic acid, 1,2,3-, 1,2,4-benzenetricarboxylic acid, 1,2,4-butanetricarboxylic acid, 2-phosphono-1,2,4-butanetricarboxylic acid, 1,3,5-benzenetricarboxylic acid, 1-hydroxy-1,2,3-propanetricarboxylic acid, 4,5-dihydro-4,5-dioxo-1H-pyrrolo[2,3-F]quinoline-2,7,9-tricarboxylic acid, 5-acetyl-3-amino-6-methylbenzene-1,2,4-tricarboxylic acid, 3-amino-5-benzoyl-6-methylbenzene-1,2,4-tricarboxylic acid, 1,2,3-propanetricarboxylic acid and aurintricarboxylic acid.

Furthermore, the at least bidentate organic compound can be alternatively or additionally derived from one or more tetracarboxylic acid including, but not limited to, 1,1-dioxidoperylo[1,12-BCD]thiophene-3,4,9,10-tetracarboxylic acid, a perylene-tetracarboxylic acid (e.g., perylene-3,4,9,10-tetracarboxylic acid and (perylene 1,12-sulfone)-3,4,9,10-tetracarboxylic acid), a butanetetracarboxylic acid (e.g, 1,2,3,4-butanetetracarboxylic acid and meso-1,2,3,4-butanetetracarboxylic acid), decane-2,4,6,8-tetracarboxylic acid, 1,4,7,10,13,16-hexaoxacyclooctadecane-2,3,11,12-tetracarboxylic acid, 1,2,4,5-benzenetetracarboxylic acid, 1,2,11,12-dodecanetetracarboxylic acid, 1,2,5,6-hexanetetracarboxylic acid, 1,2,7,8-octanetetracarboxylic acid, 1,4,5,8-naphthalenetetracarboxylic acid, 1,2,9,10-decanetetracarboxylic acid, benzophenone-tetracarboxylic acid, 3,3',4,4'-benzophenonetetracarboxylic acid, tetrahydrofuran-tetracarboxylic acid and a cyclopentanetetracarboxylic acid (e.g., cyclopentane-1,2,3,4-tetracarboxylic acid).

In certain example aspects, optionally the at least bidentate organic compound can include one or more monosubstituted aromatic dicarboxylic, tricarboxylic or tetracarboxylic acid having one, two, three, four or more rings in which each of the rings includes at least one heteroatom, with two or more rings capable of having identical or different heteroatoms. For example, the at least bidentate organic compound can include one or more one-ring dicarboxylic acids, one-ring tricarboxylic acids, one-ring tetracarboxylic acids, two-ring dicarboxylic acids, two-ring tricarboxylic acids, two-ring tetracarboxylic acids, three-ring dicarboxylic acids, three-ring tricarboxylic acids, three-ring tetracarboxylic acids, four-ring dicarboxylic acids, four-ring tricarboxylic acids and four-ring tetracarboxylic acids. Suitable heteroatoms include, but are not limited to, one or more of N, O, S, B, P. In certain example aspects, the heteroatoms include one or more of N, S and O. Suitable substituents can include, but are not limited to one or more —OH group, nitro group, amino group, alkyl and alkoxy group.

In certain example aspects, the at least bidentate organic compound can include one or more of a acetylenedicarboxylic acid (ADC), camphordicarboxylic acid, fumaric acid, succinic acid, benzenedicarboxylic acids, naphthalenedicarboxylic acids, a biphenyldicarboxylic acid (e.g, 4,4'-biphenyldicarboxylic acid (BPDC)), a pyrazinedicarboxylic acid (e.g., 2,5-pyrazinedicarboxylic acid), a bipyridinedicarboxylic acid (e.g., a 2,2'-bipyridinedicarboxylic acid such as 2,2'-bipyridine-5,5'-dicarboxylic acid), a benzenetricarboxylic acid (e.g., 1,2,3-, 1,2,4-benzenetricarboxylic acid and 1,3,5-benzenetricarboxylic acid (BTC)), benzenetetracarboxylic acid, adamantane-tetracarboxylic acid (ATC), adamantanedibenzoate (ADB), benzenetribenzoate (BTB), methanetetrabenzoate (MTB), adamantanetetrabenzoate and a dihydroxyterephthalic acid (e.g., 2,5-dihydroxyterephthalic acid (DHBDC)).

In further example aspects, the at least bidentate organic compound can include one or more of isophthalic acid, terephthalic acid, 2,5-dihydroxyterephthalic acid, fumaric acid, 1,2,3-benzenetricarboxylic acid, 1,3,5-benzenetricarboxylic acid, 2,6-naphthalenedicarboxylic acid, 1,4-naphthalenedicarboxylic acid, 1,2,3,4- and 1,2,4,5-benzenetetracarboxylic acid, camphordicarboxylic acid and 2,2'-bipyridine-5,5'-dicarboxylic acid. In yet further example aspects, the at least bidentate organic compound can be derived from one or more of fumaric acid, terephthalic acid, isophthalic acid, trimesate, aminoterephthalic acid and biphenyldicarboxylic acid.

In addition to the above-listed at least bidentate organic compounds, the MOF can further include one or more monodentate ligands.

The metal ion component of the MOF can include, but is not limited to, one or more of groups Ia, IIa, IIIa, IVa to VIIIa and Ib to VIb in the Periodic Table of Elements. In certain example aspects, the metal ion can include one or more metal selected from Mg, Ca, Sr, Ba, Sc, Y, Ti, Zr, Hf, V, Nb, Ta, Cr, Mo, W, Mn, Re, Fe, Ro, Os, Co, Rh, Ir, Ni, Pd, Pt, Cu, Ag, Au, Zn, Cd, Hg, B, Al, Ga, In, Tl, Si, Ge, Sn, Pb, As, Sb and Bi. According to certain example aspects, the metal ion can include one or more metal selected from Zn, Al, Mg, Ca, Cu, Ni, Fe, Pd, Pt, Ru, Rh, Co, Zr and Ti, and in further aspects, Zn, Al, Ni, Cu, Mg, Ca and Fe.

In certain aspects the metal ion can include one or more metal selected from aluminum (Al), iron (Fe), copper (Cu), zirconium (Zr), titanium (Ti) and chromium (Cr). Particular metal ions can include, but are not limited to, one or more of $Mg^{2+}$, $Ca^{2+}$, $Sr^{2+}$, $Ba^{2+}$, $Sc^{3+}$, $Y^{3+}$, $Tr^+$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pr$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Sr^+$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$ and $Bi^+$. In certain aspects, the MOF can include one or more of aluminum fumarate, aluminum isophthalate, zirconium terephthalate, zirconium aminoterephthalate, zirconium biphenyldicarboxylate, copper trimesate, titanium terephthalate, iron trimesate, aluminum trimesate and chromium terephthalate.

The at least bidentate organic compound can include one or more moiety selected from a phenyl moiety, an imidazole moiety, an alkane moiety, an alkyne moiety, a pyridine moiety, a pyrazole moiety, an oxole moiety and a combination thereof. In certain example aspects, the at least bidentate organic compound can include a moiety selected from one or more of the moieties illustrated in Table 2.

TABLE 2

At least bidentate Organic Compound Moieties

| Moiety 1 | 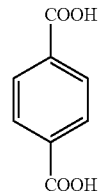 |
|---|---|
| Moiety 2 | 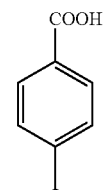 |

TABLE 2-continued

At least bidentate Organic Compound Moieties

| Moiety | Structure |
|---|---|
| Moiety 3 | benzene-1,3-dicarboxylic acid (isophthalic acid) |
| Moiety 4 | 2-methylimidazole |
| Moiety 5 | 2-amino-benzene-1,4-dicarboxylic acid |
| Moiety 6 | naphthalene-2,6-dicarboxylic acid |
| Moiety 7 | 2,5-dihydroxybenzene-1,4-dicarboxylic acid |
| Moiety 8 | acetic acid |
| Moiety 9 | 4,5-dihydropyrene-2,7-dicarboxylic acid |
| Moiety 10 | benzene-1,3,5-tricarboxylic acid (shown as 1,3-dicarboxy with COOH) |
| Moiety 11 | pyridine-2,5-dicarboxylic acid |
| Moiety 12 | fumaric acid (HOOC–CH=CH–COOH) |
| Moiety 13 | 1H-pyrazole-3,4-dicarboxylic acid |
| Moiety 14 | furan-2,5-dicarboxylic acid |
| Moiety 15 | 5-methyl-benzene-1,3-dicarboxylic acid |

In certain MOF compositions, the metal ion can be an aluminum (Al) ion and the at least bidentate organic compound can be derived from one or more of fumaric acid, terephthalic acid or isophthalic acid. In yet further MOF compositions, the metal ion can be an iron (Fe) ion and the at least bidentate organic compound can be derived from 1,3,5-benzenetricarboxylic acid. Examples of specific MOF materials useful in the active layer are listed in Table 1.

The surface area of the material can be determined by the BET (Brunauer-Emmett-Teller) method according to DIN ISO 9277:2003-05 (which is a revised version of DIN 66131). The specific surface area is determined by a multi-point BET measurement in the relative pressure range from 0.05-0.3 $p/p_0$.

The active layer can have a Langmuir surface area about 500 $m^2/g$ or more, or about 700 $m^2/g$ or more, or about 900 $m^2/g$ or more, or about 1100 $m^2/g$ or more, or about 1500 $m^2/g$ or more, or about 1700 $m^2/g$ or more, or about 2000 $m^2/g$ or more, or about 2500 $m^2/g$ or more. The average pore diameter of the MOF material in the active layer can be about 0.30 nm or more, or about 0.30 nm to about 10 nm, or about 0.30 nm to about 2.0 nm, or about 0.30 nm to about 0.70 nm, or about 0.90 nm to about 1.5 nm.

The active layer can have a thickness of about 50 μm to about 500 μm, or about 100 μm to about 250 μm, or about 150 μm to about 200 μm, or about 100 μm to about 200 μm, or about 150 μm to about 250 μm. The combined thickness of the composite material including both the primer layer and the active layer can be about 100 μm to about 260 μm, or about 100 μm to about 250 μm, or about 100 μm to about 210 μm, or about 100 μm to about 200 μm, or about 100 μm to about 160 μm or about 100 μm to about 150 μm.

The binder component of the active layer can be a water-based or solvent-based material. For example, the binder component can include one or more of a polyacrylamide, polyacrylate, polytetrafluoroethylene, polyvinylidene fluoride and a polyalkyleneimine (e.g., polyethylenimine).

In certain example aspects, the binder component is a water-based material.

As will be discussed in more detail below, the active layer can be formed by dispersing a MOF in powder form within the binder. The active layer can include about 2 wt % to about 25 wt %, preferably 2 wt % to 20 wt %, more preferably 5 wt % to 20 wt %, even more preferably 5 wt % to 15 wt %, of the binder material where the weight percent is it percent of solid mass of the binder relative to the total solid mass of the active layer. In certain aspects, the active layer can include about 2 wt % to about 25 wt %, preferably 5 wt % to 25 wt %, more preferably 5 wt % to 20 wt %, even more preferably 7.5 wt % to 20 wt %, of the binder.

The composite material can be in the form of a multi-layered film. For example, the multi-layered film can include a primer layer and 2 or more coatings of the active layer. In certain aspects, the multi-layered film may include 2 to 10 coatings of the active layer. The multi-layered film can also include a primer layer between each active layer. The primer layer of the composite material can have a thickness of about 0.05 μm to about 15 μm, or about 0.05 μm to about 5 μm. The active layer can have a thickness of about 50 μm to about 750 μm.

The composite material can be formed to have a variety of properties that enhance its performance in certain applications, for example, heat transfer applications, where the material is subject to temperature swing cycles and moisture (e.g., humidity). For example, the composite material can have a water adsorption capacity of about 0.3 g/g to about 0.8 g/g and a bulk density of about 0.2 g/cm$^3$ to about 2 g/cm$^3$. The composite material can have a Brunauer-Emmett-Teller (BET) surface area of at least 200 m$^2$/g, or a BET surface area of at least 500 m$^2$/g, or a BET surface area of about 200 m$^2$/g to about 3,000 m$^2$/g. Even when repeatedly exposed to multiple temperature swing cycles and moisture, the active layer maintains adhesion to the primer layer. For example, the active layer maintains adhesion to the primer layer upon repeated exposure to a temperature of about 20° C. to about 150° C. at a relative humidity of about 5% rH to about 100% rH. The terms "humidity" and "moisture" can include water content as well as the vapor content of other solvents.

The term "repeated exposure" can include about 10 cycles to about 1,000,000 cycles in a heat transfer device. In certain aspects, the term "repeated exposure" can include about 500 cycles to about 1,000,000 cycles in a heat transfer device. The heat transfer device can include, but is not limited to, a chiller, a heat pump, a heating, ventilating and air conditioning (HVAC) system, a radiator and a refrigerator.

According to various example aspects, the disclosure is further directed to an article including a substrate having the composite material (described above) attached thereto. The primer layer can form a coating on, or can be otherwise attached to, the substrate. The active layer can form a coating on, or can be otherwise attached to, the primer layer.

In certain example aspects, the substrate can include one or more material selected from a metal, polymer (including plastics), paper, glass, ceramics, woven fabric, non-woven fabric, fiber composite material and composite materials of any of the foregoing (e.g., polymer coated metal). The substrate can be a rigid three-dimensional object (e.g., a component of a heat transfer device, a jar, bottle, can, container, drum, tote or intermediate bulk container, foam) made of a metal or plastic, a flexible foil (e.g., polypropylene, polypropylene fibers, polyethylene, polystyrene, polyethylene terephthalate, polyethylene terephthalate fibers, polyester, flash-spun high-density polyethylene, molded fiber, aluminum, stainless steel, aluminum coated polymer, nylon polyamide, pressed paperboard, or biodegradable versions thereof or a flexible fabric (e.g., woven and non-woven materials, cotton fabric, paper, tissues, polyethylene fabrics, polyethylene terephthalate fabrics, glass fiber, carbon fiber). In certain example aspects, the substrate can be a heat transfer element. For example, the substrate can be a chiller component, a heat pump component, a heating, ventilating and air conditioning (HVAC) component, a packaging component, an odor removal component, a radiator component, a fin of a heat transfer device, or a refrigerator component.

Among other properties, it is important for the composite material to maintain adhesion to the substrate during an application, for example, a heat transfer application including repeated exposure of the article to temperature swing cycles and moisture. For example, the composite material can have an adhesion to the substrate of about 7.5 N/m or more as measured by a 90° peel test measured at 50 mm/min (DIN 28510 standard) at 25° C. and a relative humidity of 40%. In certain aspects, the composite material can maintain an adhesion to the substrate of about 5 N/m or more after immersion of the article in boiling water for about 3 min as measured by a 90° peel test measured at 50 mm/min.

According to further example aspects, the disclosure is directed to a method of forming a composite material as described above. The method can include forming the primer layer and forming the active layer on the primer layer. Forming the active layer on the primer layer can include coating the primer layer with the active layer. Forming the active layer on the primer layer can include dip coating, spray coating, electrostatic spray coating, knife coating, curtain coating or slot-die coating, roll coating or spin coating the active layer onto the primer layer. For example, a component of a heat pump can coated with the primer layer and then dip coated with the active layer. In certain example aspects, the MOF material can be in powder form and dispersed in water to form a dispersion to which the binder is added—the resulting combination MOF-water-binder combination being coated onto the primer layer using one or more of the aforementioned techniques.

The active layer can be formed to have a MOF density about 0.2 g/cm$^3$ to about 1 g/cm$^3$, or about 0.2 g/cm$^3$ to about 0.6 g/cm$^3$. Moreover, forming the active layer on the primer layer can include coating about 1% to about 100%, or about 10% to about 100% or about 50% to about 100%, or about 75% to about 100% of the primer layer with the active layer.

In certain aspects, forming the active layer on the primer layer can include preparing a slurry of the binder and the MOF, providing the slurry and applying the slurry to the primer layer. The slurry can have a solids content of about 35 wt % or less, preferably 25 wt % or less. The slurry can have a solids content of 5 wt % to 25 wt %, preferably 5 wt % to 15 wt % or about 2.5 wt % to about 15 wt %. The slurry can have a solids content of 5 wt % to 25 wt %, preferably 7.5 wt % to 25 wt %, more preferably 7.5 wt % to 20 wt %. The slurry can further include one or more of water, a volatile organic compound and a surfactant. In certain aspects, the slurry can include water and about 5 wt % or less of volatile organic compounds, surfactants, or a combination thereof, or about 0.1 wt % or less of volatile organic compounds, surfactants, or a combination thereof. The slurry can be exposed to a shear rate of about 1/s to about 10,000/s and can have a viscosity of about 1 cP to about 30,000 cP. The slurry can be at a temperature of about 10° C. to about 60° C. and can be at a pressure of about 80 kPa to about 120 kPa.

After forming the active layer on the primer layer, the method can further include drying the active layer. Drying can include contact drying the active layer with forced convection for rigid heat exchangers or with an impinging jet dryer or an infrared dryer for roll to roll coatings. This drying step can be at a temperature of about 60° C. to about 120° C., a pressure of about ambient to about vacuum and a humidity of about 5% rH to about 40% rH.

According to yet further example aspects, the disclosure is directed to a method of forming a metal organic framework (MOF) composite material on a substrate, including forming the primer layer on the substrate (as described above), and forming the active layer on the primer layer. Forming the primer layer on the substrate can include coating the substrate using a dip coating, spray coating, roll coating, knife coating, curtain coating or slot die coating process. For example, coating the primer layer can include knife coating the active layer onto the primer layer. Forming the primer layer on the substrate and forming the active layer on the primer layer can include a continuous roll-to-roll process for a flexible substrate or a discontinuous coating process for a rigid substrate.

In yet further example aspects, the disclosure provides a method of using a composite material for adsorbing fluid, including: providing a heat transfer device having a composite material on a heat transfer component thereof, the composite material including a primer layer (as described above) and an active layer (as described above), where the active layer is formed on the primer layer. The method can further include operating the heat transfer device to adsorb or desorb a working fluid onto or from the composite material.

Operating the heat transfer device can include exposing the heat transfer component to heating and cooling at temperatures of about 20° C. to about 140° C. for about 1,000 cycles or more. In certain aspects, operating the heat transfer device can include exposing the heat transfer component to air having a moisture concentration of about 1 $g/m^3$ to about 30 $g/m^3$. Additionally or alternatively, operating the heat transfer device can include exposing the heat transfer component to an aqueous fluid for about 1,000 cycles or more.

According to various example aspects, the disclosure provides a method of using a composite material to adsorb moisture, including: providing a device having a composite material (as described above) and adsorbing moisture from an environment onto the composite material. In certain aspects, the device can be a packaging container (e.g., a shipping container) comprised of one or more material selected from a metal foil, paper, cardboard, a woven fabric, a non-woven fabric a molded plastic or metal and a cast plastic. The packaging container material can include at least one of polypropylene, polypropylene fibers, polyethylene, polystyrene, polyethylene terephthalate, polyethylene terephthalate fibers, polyester, flash-spun high-density polyethylene, molded fiber, aluminum, nylon polyamide, pressed paperboard and biodegradable versions thereof.

The composite material can be included within the device in a variety of ways. For example, the composite material can be dispersed within the device or comprised in a sachet (e.g., a perforated sachet) within the device. When dispersed or contained in a sachet within the device, the composite material can be in particulate form, for example, as pellets. Such pellets can be multi-layered pellets having a substrate core, with the primer layer coated thereon and the active layer coated on the primer layer. Additionally or alternatively, the composite material can be coated on a surface of the device (e.g., an interior surface of the device). In certain aspects, the composite material can be integrally formed or extruded with at least one surface of the device. In use, the composite material can adsorb moisture and/or gases from the atmosphere within the device.

According to various example aspects of the disclosure, the composite materials described herein can have a morphology selected from a homogenous mixture, a lamellar structure, a core-shell structure, a graduated material structure, spherical or non-spherical particles embedded within a matrix, fibers or rods embedded within a matrix, woven or non-woven fiber fabric, and interpenetrating network. In certain example aspects, the morphology of the composite material is a lamellar structure, where the active layer is coated on the primer layer.

General Experimental Procedure and Materials

Substrates Types and Preparation

Various materials were used as substrates. Substrates SUB3-SUB7 were rinsed with ethanol prior to coating to remove residue. SUB2 was plasma treated using an oxygen plasma generator SLS-16 Amp; Pico Diener) at for 3 min at 100% power to improve wetting performance. The following table gives an overview of the substrates and respective coating methods used in the examples.

TABLE 1

| # | Substrate | Specification | Coating method |
|---|---|---|---|
| SUB1 | Aluminium foil | Nippon foil (1N30), 20 μm | Knife coating |
| SUB2 | Polyethylene terephthalate foil | Hostaphan GN, 100 μm | Knife coating |
| SUB6 | Steel plates | 16MO3 (1.5415), 4 mm | Knife coating |
| SUB3 | Aluminum heat exchanger plate 1 | Raw aluminum plates with punched holes for tube fitting 390 $g/m^2$ | Dip coating |
| SUB4 | Aluminum heat exchanger plate 2 | Aluminum heat exchanger plate 2 with polymeric corrosion protection coating 311 $g/m^2$ | Dip coating |
| SUB5 | Polypropylene corrugated plastic | 287 $g/m^2$ | Dip coating |

Materials and Additives

Commercial Aluminium Fumarate (Basolite A520; BASF SE) was used as active material and Polyethyleneimine (Lupasol PS; BASF SE) was used as primer. The materials used as binders and processing additives are listed in the following tables.

TABLE 2

| # | Material | Function | Specification |
|---|---|---|---|
| A1 | Aluminium fumarate | Active material | Basolite A520 |
| P1 | Polyethyleneimine | Primer | Lupasol PS; Lot 44407588Q0; BASF SE) |
| B1 | Polyacrylate | Binder | Joncryl 3030 |
| B2 | Polyethyleneimine | Binder | Lupaso PS; Lot 44407588Q0; BASF SE) |
| B3 | Polytetrafluoroethylene | Binder | Teflon ® 30-N (aqueous dispersion) |
| B4 | Polyvinylidene fluoride | Binder | Kynar HSV900 |
| B5 | Polyacrylic acid | Binder | Sokalan PA110S, Lot 60166409T0, (35% ige Lösung) Hersteller BASF SE |

Note: MOF powder contains significant amount of water at ambient conditions. The amounts given in this description refer to mass of dry MOF. Prior to mixing the residual solvent content of the MOF powder was determined and the added mass was corrected accordingly.

Preparation of the Primer Solution

The Polyethyleneimine solution (Lupaso PS; Lot 44407588Q0; BASF SE) was diluted from its original solid content of 32.76 wt. % to 6.55 wt. % with demineralized water.

Methods Used to Process Flat Samples (Method 1)

The primer solution (6.55 wt. % Lupasol PS) was coated onto the substrate using a 25 μm wire bar applicator that was pulled over the substrate at 30 mm/s and a deposition volume of 2 ml.

The primer film was dried using contact drying at 60° C. using an electrically temperature controlled vacuum plate Water was deposited into a polypropylene mixing container and Basolite powder was added under manual stirring. The powder was then dispersed using a centrifugal mixer for 5 min at 2000 rpm. Subsequently the binder dispersion or solution was added and again dispersed for 9 min at 2000 rpm.

This MOF slurry was coated onto the substrate using a knife coating system with a 200 μm gap setting at 150 mm/s and a deposition volume of 8 ml.

The active layer was dried by contact drying at 60° C. using an electrically temperature controlled vacuum plate.

Methods Used to Process Complex Geometries (Method 2)

1000 ml of primer solution (6.55 wt. % Lupasol PS) was filled into a standing cylinder at 25° C. Substrates were dipped into the solution for 3 seconds and removed manually at a speed of ~5 mm/sec.

The primer film was dried in a drying cabinet (UN110Plus; Memmert) at 60° C. for 1.5 hours.

Water was deposited into a 1 Liter stainless steel container and Basolite powder was added while stirring. Subsequently the binder dispersion or solution was added and dispersed using a dissolver type stirrer for 4 hour at 1200 rpm and 500 mbar absolute pressure. The solid content during this step was 22 wt.-% and the dispersion was then diluted to the desired coating viscosity by adding water followed by dispersion at 50 rpm for 2 hours min at 500 mbar absolute pressure.

Coating of active layer: 1000 ml of the MOF slurry was filled into a beaker at 40° C. and constantly stirred by a magnetic stirrer. Substrates were dipped into the solution for 3 seconds and removed at a speed of 150 mm/sec.

The active layer was dried in a drying cabinet (UN110Plus; Memmert) at 60° C. for 1.5 hours.

Analytic Methods

Solid content was measured using a dry-weight-scale (setting 120° C.; HB43-S; Mettler Toledo).

Adhesion on a reference substrate was measured by a 90° peel test measured at 50 mm/min at 25° C. and a relative humidity of 40% rH according to DIN 28510. Aluminum foil (Nippon foil (1N30) 120 mm×20 μm) was used as reference substrate for metal surfaced and PET foil (Hostaphan GN 100 μm) as reference substrate for plastic surfaces.

A scotch test was used to evaluate adhesion after the water bath test. A 10 cm stripe of adhesive tape (Scotch Crystal 600, 3M) was placed on the coating and pressed to the surface using a 2 kg rubber roll. The tape was removed rapidly at a 90° angle from the substrate. The amount of removed coating was determined by graphic analysis using the histograph function of Corel Photo Paint X7.

Water uptake at 97% rH was determined by measuring the weight change of sample that were placed in a controlled humidity at 25° C. Samples were dried for 16 h at 150° C. to determine dry weight.

EXAMPLES

Reference Sample (EX1)

As a reference a coating of aluminium fumarate (A1) was prepared on a steel plate (SUB6) using Polyacrylate as binder (B5) and the method for processing flat substrates (Method 1). The overall solid content was 21.2 wt. % and the binder content in the dried film was 5 wt. %.

Coating with PEI Primer (EX2)

According to this invention a second sample was prepared using the same method (Method 1) but applying a thin layer of Polyethyleneimine (P1) before coating of the aluminium fumarate (A1).

The dry film thickness of both coatings was determined to be 55-60 μm.

The coatings were immersed in boiling water for 3 minutes. During the immersion time the water in the 500 ml beaker was stirred with a magnetic stirrer at 500 rpm. After the removal from the bath the coating were dried and adhesion was evaluated using a scotch test.

TABLE 3

| Example | Description | material removed by scotch test after boiling water test. |
|---------|-------------|------------------------------------------------------------|
| EX1     | no primer   | 80%                                                        |
| EX2     | with primer | <1%                                                        |

Surprisingly, it was found that adhesion of the coating with PEI primer is very good with less than 1% removed material and significantly better compared to the reference sample (80% removed coating).

To verify this result, a dispersion with 20 wt.-% solid content and 19.6 wt.-% binder in solid mass was prepared using Method 1. This formulation was knife coated on Aluminum foil (SUB1) with and without PEI primer yielding an active layer of 81 μm. Adhesion was measured by standardized 90° peel test before and after the water bath treatment (see Table 4). As expected before the treatment adhesion is higher for the coating with primer (EXP3 & EXP4). Whereas the water bath causes a decrease of 3 N/m for the reference coatings, adhesion of the coating with primer layer does not decrease significantly.

TABLE 4

| Example | Binder        | Treatment        | Method      | Adhesion [N/m] |
|---------|---------------|------------------|-------------|----------------|
| EX3     | B1 (Polyacryl)| none             | ref         | 13.95          |
| EX4     | B1 (Polyacryl)| none             | with primer | 24.21          |
| EX5     | B1 (Polyacryl)| after water bath | ref         | 11.06          |
| EX6     | B1 (Polyacryl)| after water bath | with primer | 23.81          |

Water uptake of the coatings from EXP5 and EXP6 was measured at 97% rH and shows no significant difference compared to raw MOF powder (see Table 5).

TABLE 5

| Water absorption meausrement | | | | |
|---|---|---|---|---|
| Example | Binder | Relative humidity | Method | Water uptake % g $H_2O$/g MOF |
| Powder | none | 97% | none | 68.9 |
| EX5 | B1 | 97% | with primer | 70.2 |
| EX6 | B1 | 97% | ref | 61.2 |

Since Polyethyleneimine is intrinsically water soluble it is not an obvious choice for adhesion promotion for coatings that are exposed to harsh conditions (such as boiling water or the conditions in a sorption heat pump).

Binder Screening

In the following experiments, various binders were used to coat on aluminum foil (SUB1) with and without PEI primer layer. The films and dispersions were prepared using the same method as before (Method 1) with a solid content of 20.4 wt % and a binder content of 7.5 wt.-% with respect to solids. For the solvent based binder PVDF (B4), NMP was added as solvent instead of water. Adhesion was determined by a standardized 90° peel test and is summarized in the following table:

TABLE 6

Substrate = Aluminium

| Example | Binder | Method | Adhesion [N/m] | StDev [N/m] |
|---|---|---|---|---|
| EX7 | PVDF | B4 with primer | 8.07 | 0.40 |
| EX8 | PVDF | B4 ref | 3.77 | 0.15 |
| EX9 | Joncryl | B1 with primer | 12.11 | 0.70 |
| EX10 | Joncryl | B1 ref | 2.46 | 0.15 |
| EX11 | Lupasol | B2 with primer | 7.63 | 1.49 |
| EX12 | Lupasol | B2 ref | 2.63 | 0.00 |
| EX13 | PTFE | B4 with primer | 10.53 | 2.63 |
| EX14 | PTFE | B4 ref | 3.95 | 1.32 |

The primer coating detailed in this invention shows an increased adhesion for all tested binders. The average overall increase is ~300% which has a significant impact on the applicability of the formulation for an industrial coating application.

Substrate Material

Aluminum is a common substrate material for heat exchanger application. However, in some applications the aluminum surface is covered with a thin anti corrosion polymer film or the complete substrate is made from a polymeric material. To investigate adhesion on polymeric surfaces, reference coating (without primer) and coatings prepared according to this invention (with primer) were prepared on Polyethylene terephthalate foil (SUB2).

TABLE 7

Substrate = PET (Hostaphan GN)

| Example | Binder | Method | Adhesion [N/m] | StDev [N/m] |
|---|---|---|---|---|
| EX15 | PVDF | B4 with primer | 20.26 | 0.70 |
| EX16 | PVDF | B4 ref | 9.12 | 2.64 |
| EX17 | Joncryl | B1 with primer | 23.95 | 0.95 |
| EX18 | Joncryl | B1 ref | 6.05 | 0.26 |
| EX19 | Lupasol | B2 with primer | 16.49 | 1.98 |
| EX20 | Lupasol | B2 ref | 9.56 | 1.00 |

Adhesion of the MOF coating on polymer surfaces is increased for all tested binders by 245% by using the primer coating method described in this invention.

Thus, the method described in this invention is not only applicable for metal surfaces but also extends to polymer surfaces. Adhesion on polymer surfaces is often more critical and is desired in many open air conditioning applications (see i.e. [1]).

Coating of Complex Geometries

Whereas knife coating on flat foils is useful for characterization the technology used in typical applications will be dip coating and the surfaces will be corrugated and curved rather than flat. To show that the method described in this invention can be used in a dip coating process for complex geometries, two heat exchanger finns (SUB3, SUB4) and a corrugated polypropylene plastic sheet (SUB5) were precessed using Method 2. Both primer layer and active layer were applied by dip coating. Due to insufficient adhesion SUB5 could not be coated by the reference method. Area specific coating weight for the dry primer coating and dry active layer are presented in Table 8.

Due to the irregular shape of the substrate adhesion cannot be quantified. The coatings with primer EX22, EX24 and EX25 showed qualitative better adhesion than the reference samples (EX21 & EX23) and demonstrate that the method described in this invention is applicable to a dip coating process. The coating weight of the active layer is consistently higher for the coatings with primer compared to the reference coatings which is an added advantage since high coating weight is desired in most applications.

TABLE 8

| Example | Substrate | Method | Coating weight primer [g/m$^2$] | Coating weight active Layer [g/m$^2$] |
|---|---|---|---|---|
| EX21 | SUB3 (Raw aluminum heat exchanger finn) | ref | — | 61.0 |
| EX22 | SUB3 (Raw aluminum heat exchanger finn) | with primer | 6.5 | 61.3 |
| EX23 | SUB4 (Polymer coated Aluminum hx-finn) | ref | — | 59.8 |
| EX24 | SUB4 (Polymer coated Aluminum hx-finn) | with primer | 5.5 | 65.9 |
| EX25 | SUB5 (Polypropylene corrugated plastic) | with primer | 6.1 | 90.4 |

REFERENCE LIST

[1] R. Macriss, W. Rush, S. Weil, "Desiccant system for an open cycle air-conditioning system", Google Patents, 1974.

The invention claimed is:

1. An article comprising:
   a substrate; and
   a composite material comprising:
   a primer layer comprising a polyalkylenimine; and
   an active layer comprising a binder and a metal organic framework (MOF), wherein the MOF comprises an at least bidentate organic compound coordinated to a metal ion, wherein the active layer forms a coating on the primer layer and wherein the primer layer forms a coating on the substrate and wherein the substrate is a heating, ventilating and air conditioning (HVAC) component.

2. The article as claimed in claim 1, comprising branched polyalkylenimine, straight polyalkylenimine or a combination thereof.

3. The article as claimed in claim 1, wherein the polyalkylenimine has a charge density of about 1 to about 35 meq/g.

4. The article as claimed in claim 1, wherein an alkylene moiety comprises ethylenimine, 1,2-propylenimine, 1-2-butylenimine, 2,3-butylenimine or a combination thereof.

5. The article as claimed in claim 1, wherein the molecular weight of the polyalkylenimine is from 20,000 Daltons to 3,000,000 Daltons.

6. The article as claimed in claim 1, wherein the polyalkylenimine is polyethylenimine.

7. The article as claimed in claim 1, wherein the primer layer further comprises a binder component.

8. The article as claimed in claim 1, wherein the primer layer has a thickness of 10 µm or less.

9. The article as claimed in claim 1, wherein the active layer has a thickness of 50 µm to 500 µm.

10. The article as claimed in claim 1, wherein the metal ion comprises a metal selected from a group consisting of aluminum (Al), iron (Fe), copper (Cu), zirconium (Zr), titanium (Ti) and chromium (Cr) and/or the at least bidentate organic compound is derived from a compound selected from a group consisting of fumaric acid, terephthalic acid, isophthalic acid, trimesate, aminoterephthalic acid and biphenyldicarboxylic acid.

11. The article as claimed in claim 1, wherein the active layer comprises about 2 wt % to about 25 wt % of the binder.

12. The article as claimed in claim 1, wherein the material has a water adsorption capacity of about 0.3 g/g to about 0.8 g/g.

13. The article as claimed in claim 1, wherein the material has a bulk density of about 0.2 g/cm$^3$ to about 2 g/cm$^3$ and a Brunauer-Emmett-Teller (BET) surface area of at least 200 m$^2$/g.

14. The article as claimed in claim 1, wherein the active layer has an adhesion to the primer layer of about 7.5 N/m or more.

15. The article as claimed in claim 1, wherein the active layer maintains adhesion to the primer layer upon repeated exposure to a temperature of about 20° C. to about 150° C. at a relative humidity of about 5% rH to about 100% rH.

16. The article of claim 15, wherein repeated exposure comprises about 10 cycles to about 1,000,000 cycles in a heat transfer device.

17. A method of forming the article of claim 1, comprising:
coating the substrate with a primer layer comprising polyalkylenimine; and
coating the primer layer with an active layer comprising a binder and a metal organic framework (MOF), wherein the MOF comprises a bidentate organic compound coordinated to a metal ion.

18. The method as claimed in claim 17, wherein the coating of the primer layer with the active layer comprises providing a slurry of the binder and the MOF and the slurry has a solids content of about 5 wt % to 25 wt %.

19. A method of heat transfer by using the article of claim 1 for adsorbing fluid, comprising:
providing a heat transfer device comprising a composite material on a heat transfer component thereof, the composite material comprising:
a primer layer comprising a polyalkylenimine; and
an active layer comprising a binder and a metal organic framework (MOF), wherein the MOF comprises a bidentate organic compound coordinated to a metal ion,
wherein the active layer forms a coating on the primer layer; and
operating the heat transfer device to adsorb or desorb a working fluid onto or from the composite material.

20. A method of adsorbing moisture by use of the article of claim 1, comprising:
providing a device comprising a composite material, the composite material comprising:
a primer layer comprising a polyalkylenimine; and
an active layer comprising a binder and a metal organic framework (MOF),
wherein the MOF comprises a bidentate organic compound coordinated to a metal ion,
wherein the active layer forms a coating on the primer layer; and
adsorbing moisture from an environment onto the composite material.

* * * * *